Aug. 26, 1924.　　　　　　　　　　　　　　1,506,290
J. W. CARDWELL
OILER FOR POULTRY AND ANIMALS
Filed Oct. 13, 1923
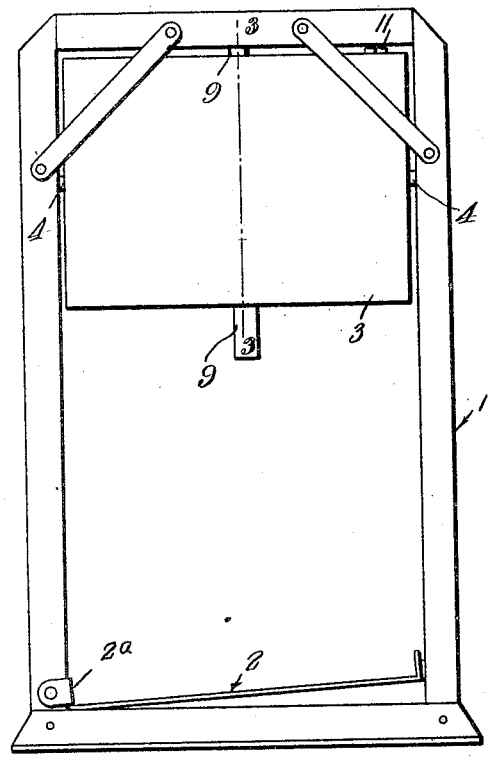
Fig. 1.
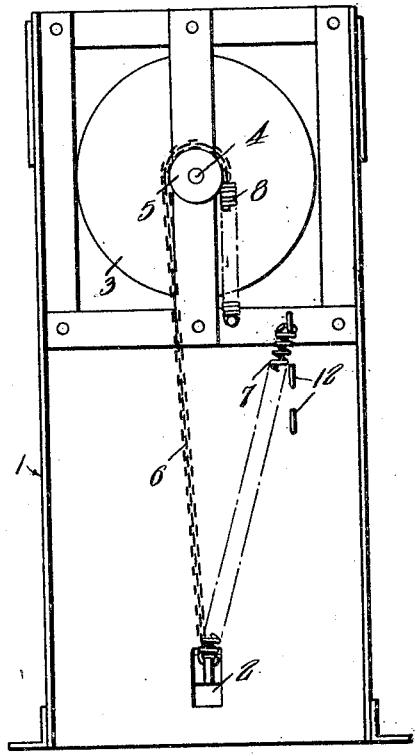
Fig. 2.
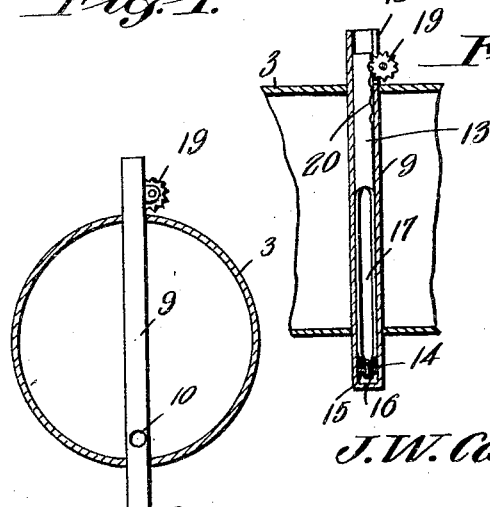
Fig. 3.
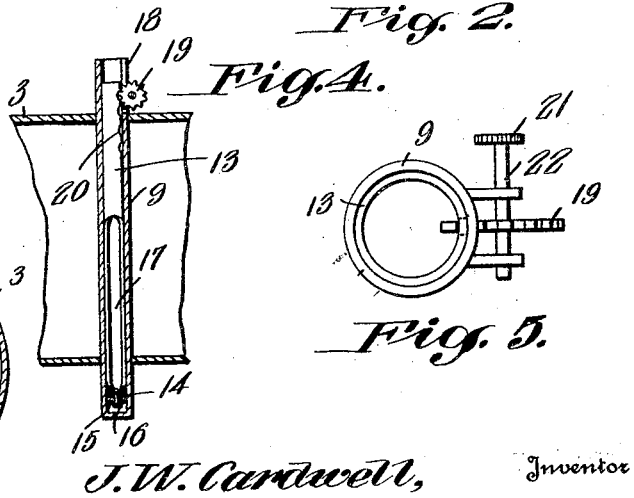
Fig. 4.
Fig. 5.
J. W. Cardwell, Inventor
By C. A. Snow & Co.
Attorneys Patented Aug. 26, 1924.

1,506,290

UNITED STATES PATENT OFFICE.

JOHN WILLIAM CARDWELL, OF REPUBLIC, KANSAS, ASSIGNOR OF ONE-HALF TO FRANK Z. STOVER, OF REPUBLIC, KANSAS.

OILER FOR POULTRY AND ANIMALS.

Application filed October 13, 1923. Serial No. 668,386.

*To all whom it may concern:*

Be it known that I, JOHN WILLIAM CARDWELL, a citizen of the United States, residing at Republic, in the county of Republic and State of Kansas, have invented a new and useful Oiler for Poultry and Animals, of which the following is a specification.

This invention relates to oilers for poultry, animals and the like.

The object of the invention is to provide a simple and efficient apparatus of this character constructed so that the weight of an animal or fowl stepping on a platform will operate the oil delivery device and automatically deposit a predetermined quantity of oil on the animal or fowl operating it, the parts being returned to normal position when the platform is relieved of the weight of the operating animal.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of an oiler constructed in accordance with this invention, the parts being in normal position ready to receive a fowl or animal to be oiled.

Fig. 2 is an end elevation thereof; and

Fig. 3 is a transverse section taken on the line 3—3 of Fig. 1.

Fig. 4 is a detail sectional view taken on a plane at right angles to that shown in Fig. 3; and Fig. 5 is a plan view showing the telescoping tubes and the adjusting mechanism for the inner tube.

In the embodiment illustrated the oiler constituting this invention comprises a supporting frame 1 constructed of angle iron or any suitable material with a tilting platform 2 mounted by means of a clip 2ª which is pivotally engaged with the lower end of one of the upright frame members. A rotatable tank 3 is located in the upper end of the frame above said platform.

The tank 3 is here shown cylindrical in form although obviously it may be of any other desired shape and is provided in its ends with journals 4 rotatably mounted in the frame 1 to permit the tank to be turned for a purpose presently to be described. One of the journals projects through one end of the frame 1 and has fixedly secured thereto a pulley 5 with which is connected one end of a chain 6 the other end being secured to the platform 2 as is shown clearly in Fig. 2. A coiled spring 7 is also connected with the platform 2 and with the frame and operates to normally hold the platform in elevated position, the spring being secured to one end of the platform and the other end thereof pivoted to the frame. Another coiled spring 8 is secured at one end to the frame 1 and at its other end to the pulley 5 as shown in Fig. 2 and exerts its tension to turn the pulley in the direction opposite to that in which it is turned by a pulley on chain 6.

A pipe 9 extends transversely through tank 3 as shown clearly in Fig. 3, with its ends extending through the tank one being closed and the other open to the atmosphere. This pipe 9 has an aperture 10 adjacent the closed end thereof through which oil or other fluid is designed to pass into a tube 13 located in tube 9, the tank being airtight. A removable plug 11 is secured airtight in the upper portion of the tank and is designed to be removed to permit air to enter the tank during the filling operation which is accomplished through the tube 9.

The inner tube 13 is mounted to slide in tube 9 having a fluid-tight connection at the bottom of tube 13 provided by a leather washer 14 held between the bottom of tube 13 and a steel washer 15 by a screw or bolt 16. The inner tube 13 has a longitudinal opening 17 in one side wall extending from its bottom to a point about midway its length (see Fig. 4.). This slot 17 is located opposite the opening 10 registering therewith to permit the contents of tank 3 to enter the outside tube 9 without any interference from the inside tube. The outside tube 9 has a longitudinal slot 18 in its upper end in which works a toothed wheel 19 the teeth of which engage apertures 20 in tube 13 whereby said tube 13 is raised and lowered on the turning of said wheel which is accomplished by means of a knurled disk 21 carried by a shaft 22 to which wheel 19 is fixed. The arrangement of tubes herein shown and described provides for varying the quantity of oil to be ejected on the tilting of the tank.

A plurality of hooks 12 are mounted on the frame 1 for the adjustable connection of the spring 7 to adapt the platform 2 to be depressed by animals or fowls of different weights.

When the tank 3 is filled with oil or other liquid for treating fowls or animals the plug 11 being inserted therein the tank is airtight so that only a certain amount of oil will enter tube 9 through opening 10, the vacuum in the tank shutting off the liquid and preventing any more from entering until the tube is emptied.

In the use of this apparatus the parts being in the position shown in Figs. 1 and 2 an animal or fowl stepping onto the platform 2 will depress it against the tension of the spring 7 exerting a pull on chain 6 which operates to rotate tank 3 a one-half turn thus reversing the position of tube 9 causing the contents thereof to flow out and be deposited on the animal on the platform. When this tube empties air will enter the tank therethrough so that when the tank rights on the release of the platform the tube will again fill. It is of course understood that the coil spring 8 operates to turn the tank to its normal position after the weight has been removed from the platform.

Various changes in the form, shape, proportion and other minor details of construction may be made without departing from the principle or sacrificing any of the advantages of the claimed invention.

I claim:—

1. An oiler of the class described comprising a supporting frame, a depressible platform mounted in said frame, a rotatable tank mounted above said platform, a connection between said tank and platform whereby depression of the platform will turn the tank, said tank having means for delivering a predetermined quantity of the contents of the tank on the depression of the platform.

2. An oiler of the class described comprising a supporting frame, a depressible platform mounted in said frame, a movable tank mounted above said platform, a connection between said platform and tank, whereby depression of the platform will move the tank, said tank having means for delivering a predetermined quantity of its contents operable on the depression of said platform.

3. An oiler of the class described comprising a supporting frame, a depressible platform mounted in said frame, a movable tank mounted above said platform, a connection between said platform and tank whereby depression of the platform will move the tank, said tank having means for delivering a predetermined quantity of its contents operable on the depression of said platform, and means for automatically returning said parts to normal position when said platform is released.

4. An oiler of the class described comprising a supporting frame, a movable member mounted in the frame to receive the fowl to be treated, an airtight container mounted for tilting movement above said member and provided with a pulley, a flexible element connecting said pulley and member whereby the movement of the member will tilt the container, a tube extending into said container and open at its outer end said tube being adapted to distribute the contents of the container in predetermined quantities on the tilting of the container.

5. An oiler of the class described comprising a supporting frame, a depressible platform mounted in said frame, a tilting airtight container mounted above said platform, a flexible connection between said platform and container whereby depression of the platform will tilt the container, said container having means for delivering a predetermined quantity of its contents on the depression of said platform and the consequent tilting of the container.

In testimony that I claim the foregoing as my own, I have hereto affixed my signature in the presence of two witnesses.

JOHN WILLIAM CARDWELL.

Witnesses:
C. A. HAINES,
F. Z. STOVER.